US011342002B1

(12) United States Patent
Gupta et al.

(10) Patent No.: US 11,342,002 B1
(45) Date of Patent: May 24, 2022

(54) CAPTION TIMESTAMP PREDICTOR

(71) Applicant: Amazon Technologies, Inc., Seattle, WA (US)

(72) Inventors: Prabhakar Gupta, Delhi (IN); Shaktisingh P Shekhawat, Ahmedabad (IN); Kumar Keshav, Bangalore (IN)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/210,545

(22) Filed: Dec. 5, 2018

(51) Int. Cl.
*H04N 9/80* (2006.01)
*G11B 27/19* (2006.01)
*H04N 9/87* (2006.01)
*G11B 27/036* (2006.01)
*H04N 5/92* (2006.01)

(52) U.S. Cl.
CPC ............ *G11B 27/19* (2013.01); *G11B 27/036* (2013.01); *H04N 9/8715* (2013.01)

(58) Field of Classification Search
USPC .................................................. 386/248, 337
See application file for complete search history.

(56) References Cited

U.S. PATENT DOCUMENTS

| 8,564,721 | B1* | 10/2013 | Berry | ............. H04N 21/234336 348/515 |
| 10,122,983 | B1* | 11/2018 | Ross | ...................... G06F 16/683 |
| 10,423,660 | B1* | 9/2019 | Heo | ...................... G10L 15/265 |
| 10,424,294 | B1* | 9/2019 | Lema | ................... G06K 9/6267 |
| 2002/0135618 | A1* | 9/2002 | Maes | ..................... G06F 3/0481 715/767 |
| 2002/0161579 | A1* | 10/2002 | Saindon | .................. G06F 40/40 704/235 |
| 2003/0131362 | A1* | 7/2003 | Jasinschi | ................. G06F 16/71 725/134 |
| 2005/0106536 | A1* | 5/2005 | Liebermann | ........... G09B 21/04 434/112 |
| 2006/0136803 | A1* | 6/2006 | Erol | ........................ G06F 40/20 715/202 |
| 2007/0118374 | A1* | 5/2007 | Wise | ....................... G10L 15/26 704/235 |
| 2008/0252780 | A1* | 10/2008 | Polumbus et al. | ..... H04N 17/00 348/468 |
| 2009/0279867 | A1* | 11/2009 | Hamada | ............... G11B 27/329 386/248 |

(Continued)

Primary Examiner — Nigar Chowdhury
(74) Attorney, Agent, or Firm — Thomas | Horstemeyer LLP

(57) ABSTRACT

An automated solution to determine suitable time ranges or timestamps for captions is described. In one example, a content file includes subtitle data with captions for display over respective timeframes of video. Audio data is extracted from the video, and the audio data is compared against a sound threshold to identify auditory timeframes in which sound is above the threshold. The subtitle data is also parsed to identify subtitle-free timeframes in the video. A series of candidate time ranges is then identified based on overlapping ranges of the auditory timeframes and the subtitle-free timeframes. In some cases, one or more of the candidate time ranges can be merged together or omitted, and a final series of time ranges or timestamps for captions is obtained. The time ranges or timestamps can be used to add additional non-verbal and contextual captions and indicators, for example, or for other purposes.

20 Claims, 7 Drawing Sheets

(56) References Cited

U.S. PATENT DOCUMENTS

| | | | | |
|---|---|---|---|---|
| 2010/0150519 A1* | | 6/2010 | Takanohashi | H04N 5/783 386/278 |
| 2010/0251291 A1* | | 9/2010 | Pino, Jr. | H04N 21/4828 725/34 |
| 2010/0259676 A1* | | 10/2010 | Swan | H04N 5/44513 348/468 |
| 2011/0069230 A1* | | 3/2011 | Polumbus | G11B 27/10 348/468 |
| 2011/0078172 A1* | | 3/2011 | LaJoie | G06F 16/64 707/769 |
| 2011/0134321 A1* | | 6/2011 | Berry | G11B 27/322 348/464 |
| 2011/0243526 A1* | | 10/2011 | Hiroi | G11B 27/105 386/241 |
| 2011/0246172 A1* | | 10/2011 | Liberman | G06F 17/289 704/2 |
| 2011/0307779 A1* | | 12/2011 | Scholler | G11B 27/34 715/705 |
| 2012/0084435 A1* | | 4/2012 | Vasa | G06F 16/7844 709/224 |
| 2012/0179039 A1* | | 7/2012 | Pelissier | H04N 19/61 600/443 |
| 2013/0117793 A1* | | 5/2013 | Yang | G06F 17/289 725/110 |
| 2013/0238535 A1* | | 9/2013 | Leppanen | H04W 4/025 706/12 |
| 2014/0071342 A1* | | 3/2014 | Winograd | H04N 21/4532 348/383 |
| 2014/0184905 A1* | | 7/2014 | Mountain | H04N 21/4394 348/384.1 |
| 2014/0201631 A1* | | 7/2014 | Pornprasitsakul | G06F 3/0484 715/716 |
| 2014/0277652 A1* | | 9/2014 | Watts | G06F 3/165 700/94 |
| 2015/0215665 A1* | | 7/2015 | Casagrande | H04N 21/4888 725/32 |
| 2015/0237298 A1* | | 8/2015 | Garland | H04N 5/44513 348/466 |
| 2016/0014438 A1* | | 1/2016 | Xiong | H04N 21/8456 725/32 |
| 2016/0057317 A1* | | 2/2016 | Zhao | H04N 5/08 348/515 |
| 2016/0155456 A1* | | 6/2016 | Wang | G10L 25/18 704/208 |
| 2016/0224122 A1* | | 8/2016 | Dietz | G06F 3/147 |
| 2016/0248766 A1* | | 8/2016 | Tembey | H04L 63/0861 |
| 2016/0358312 A1* | | 12/2016 | Kolb, V | G06T 3/40 |
| 2017/0223328 A1* | | 8/2017 | Mochinaga | H04N 21/442 |
| 2017/0278525 A1* | | 9/2017 | Wang | G10L 15/20 |
| 2017/0364551 A1* | | 12/2017 | Averbuch | G06F 17/18 |
| 2018/0061439 A1* | | 3/2018 | Diamos | G10L 15/063 |
| 2018/0082688 A1* | | 3/2018 | Ashikawa | H04M 3/567 |
| 2018/0189249 A1* | | 7/2018 | Berman | G06F 40/58 |
| 2019/0082491 A1* | | 3/2019 | Shelby | H04W 76/28 |
| 2019/0096407 A1* | | 3/2019 | Lambourne | G11B 27/34 |
| 2019/0294729 A1* | | 9/2019 | Jiang | H04N 21/23418 |
| 2020/0099989 A1* | | 3/2020 | Niemirska | G06F 3/165 |

* cited by examiner

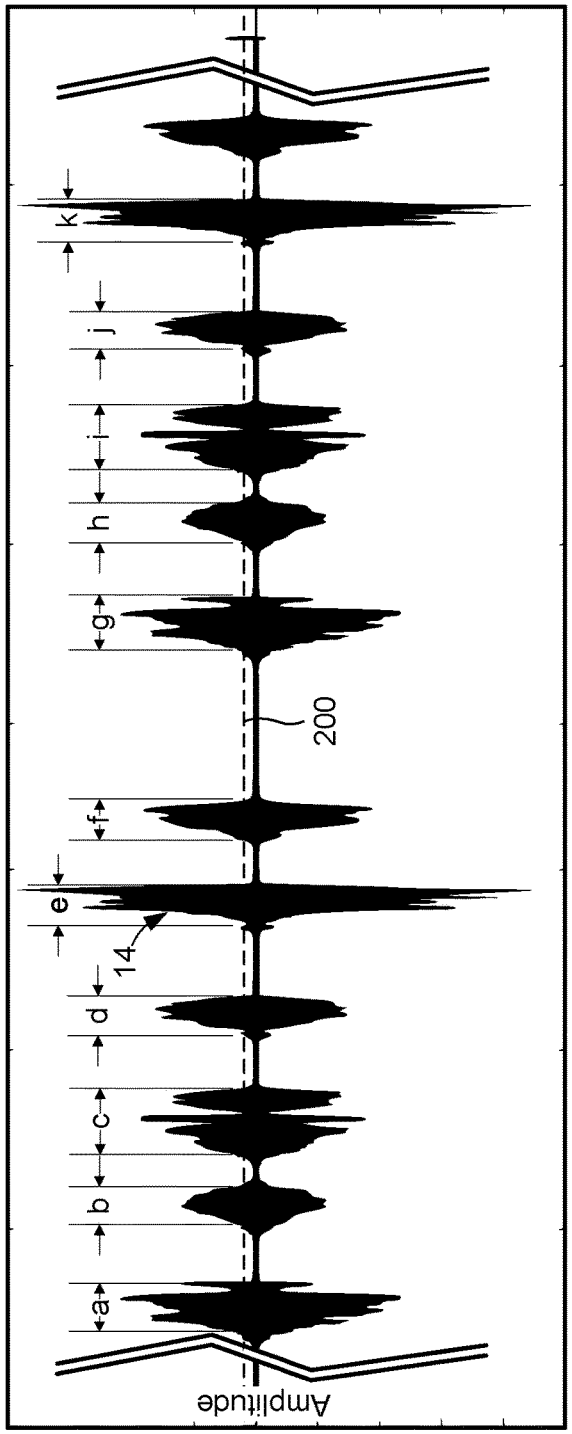
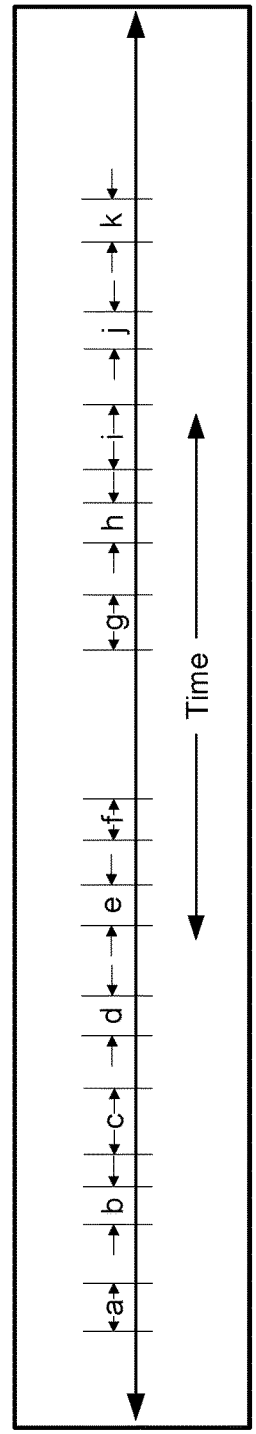
FIG. 3A
FIG. 3B

CAPTION TIMESTAMP PREDICTOR

BACKGROUND

A content delivery or distribution network is a geographically distributed network of computer servers deployed in data centers at various locations. Content delivery networks are designed to serve content, such as webpages, data files, media content, and other content to client devices.

Content delivery networks have facilitated new types of services. For example, video on demand services allow users to select and watch video content at any time and at any location with network connectivity. Video on demand services can serve video content to various types of computing devices, allowing viewing and/or downloading of such content on many different types of devices. Today, many service providers offer access to video, audio, and other types of media content based on pay-per-view, subscriber-based, and other purchase models.

In video content, subtitles or closed captions are text displayed over or upon frames in the video content, usually at the bottom of the screen. The text can include the written dialogue between actresses, actors, or other characters, foreign-dialog translations, text cues, and other non-verbal and contextual captions and indicators. The text for the subtitles can be determined from a transcript or script of dialog between actors in the video content. The text can also be provided by video editors or other individuals responsible for compiling, composing, and revising video content for distribution.

Subtitles can be rendered and incorporated into the frames of video content or provided separately. If provided separately, the subtitles can be rendered and displayed over the frames of the video content at the client device. Separate subtitles are relied upon in digital video disc (DVD), digital video broadcasting (DVB), EIA-608 captioning, and other formats in which the subtitles are hidden unless enabled.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 3A illustrates an example of audio data extracted from content according to example embodiments described herein.

FIG. 3B illustrates an example of the identification of auditory timeframes in the audio data shown in FIG. 3A according to example embodiments described herein.

DETAILED DESCRIPTION

Subtitles or closed captions are text displayed over frames in video content, usually at the bottom of the screen. The text can include dialogue between actresses, actors, or other characters, foreign-dialog translations, text cues, and other non-verbal and contextual captions and indicators. Subtitles can be rendered and incorporated into the frames of video content or provided separately. If provided separately, subtitles can be rendered and displayed over the frames of the video content at the client device. Separate subtitles are relied upon in digital video disc (DVD), digital video broadcasting (DVB), EIA-608 captioning, and other formats in which the subtitles are hidden unless enabled.

In some cases, it would be helpful to add additional subtitles to a video. The additional subtitles could include non-verbal and contextual captions and indicators, for example. However, it can be relatively time consuming for individuals to identify suitable time ranges to add additional subtitles in a video.

In the context outlined above, an automated solution to determine suitable time ranges or timestamps for captions is described. In one example, a subtitle file includes subtitle captions for display over respective timeframes of a video file. Audio data is extracted from a video file, and the audio data is compared against a sound threshold to identify auditory timeframes in which sound is above the threshold. The subtitle file is also parsed to identify subtitle-free timeframes in the video file. A series of candidate time ranges is then identified based on overlapping ranges of the auditory timeframes and the subtitle-free timeframes. In some cases, one or more of the candidate time ranges can be merged together or omitted, and a final series of time ranges or timestamps for captions is obtained. The time ranges or timestamps can be used to add additional non-verbal and contextual captions and indicators, for example, or for other purposes.

Figure 1:
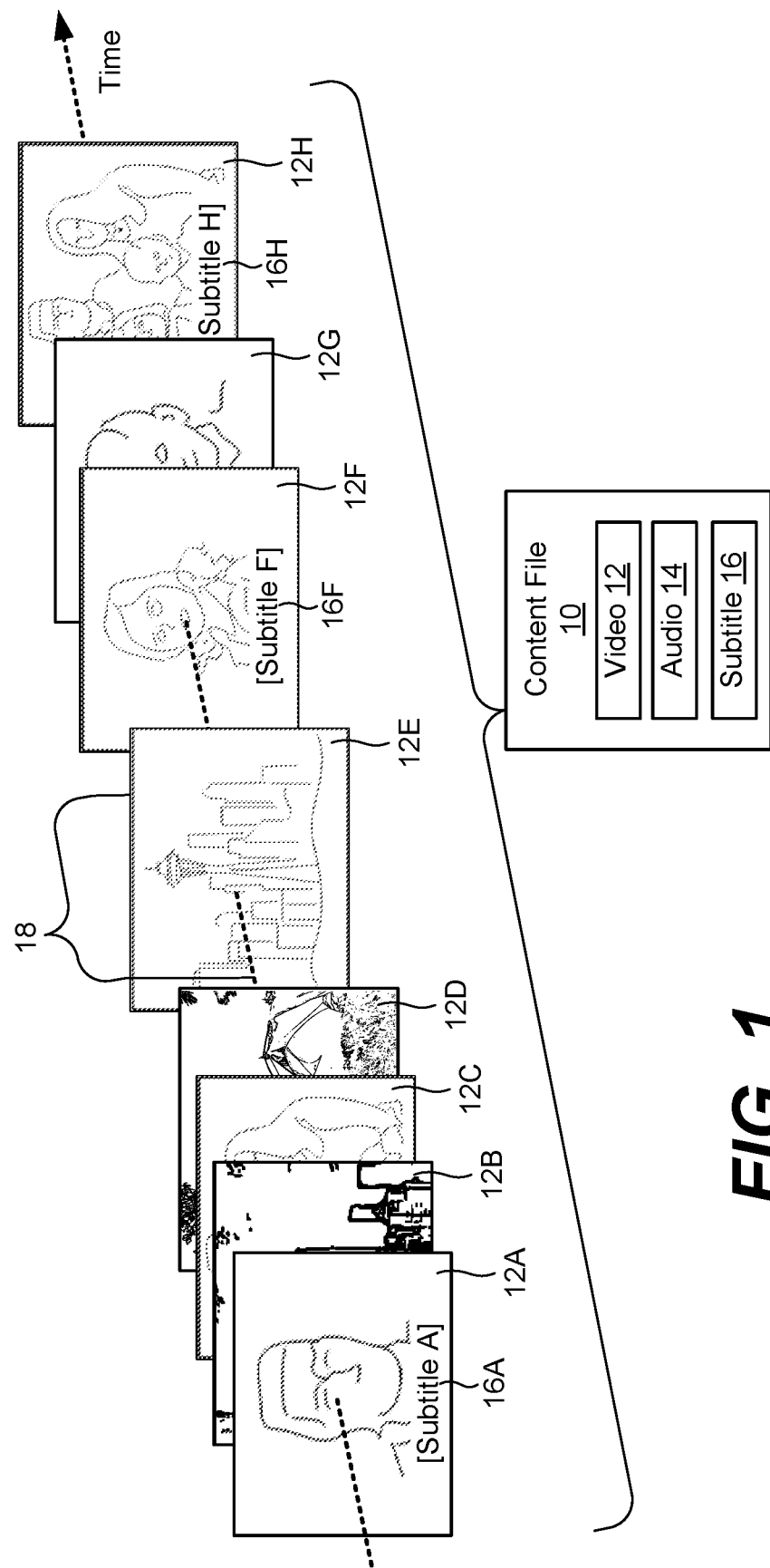
FIG. 1 illustrates frames of video content with subtitles according to example embodiments described herein.

Turning to the drawings for additional context, FIG. 1 illustrates frames of video content with subtitles according to example embodiments described herein. Although several examples are described below in connection with video content, the embodiments described herein are not limited to use with video content.

In FIG. 1, a content file 10 includes video data 12, audio data 14, and subtitle data 16, among other data. Although the content file 10 is illustrated as a single data file in FIG. 1, the video data 12, audio data 14, and subtitle data 16 can be separated from each other (e.g., provided in separate data files) in certain cases. For example, the subtitle data may be provided in a separate subtitle file, and the video and audio data can be encoded together in a separate video file. In any case, the subtitle data includes subtitle captions for display over respective timeframes of the video data.

A number of video frames 12A-12H of the content file 10 are shown in FIG. 1, over time. The video frames 12A-12H are representative of a relatively small subset of the total number of image frames of the video data 12. A number of subtitles 16A, 16F, and 16H of the content file 10 are shown in FIG. 1. The subtitles 16A, 16F, and 16H are rendered and displayed over the video frames 12A, 12F, and 12H, respectively, based on the subtitle data 16 in the content file 10. The subtitles 16A, 16F, and 16H can each include text, such as the written dialogue between actresses, actors, or other characters, foreign-dialog translations, text cues, and other captions.

For various reasons, it could be helpful to add additional subtitles to the content file 10, such as additional text cues and other non-verbal and contextual captions and indicators. It can be relatively time consuming to identify suitable time ranges in the content file 10 in which to insert these additional captions. Individuals have been relied upon in some cases to identify suitable time ranges to insert additional captions. To do so, it has been necessary for the individuals to review the content file 10 (e.g., observe or watch and listen to the playback of the content file 10) and manually identify the time ranges. One example of a suitable time range to add an additional subtitle is one in which the content file 10 is subtitle-free but also includes an audible or auditory response. In FIG. 1, the time range 18 is an example a suitable time range in the content file 10 in which to insert one or more additional captions.

Figure 2:
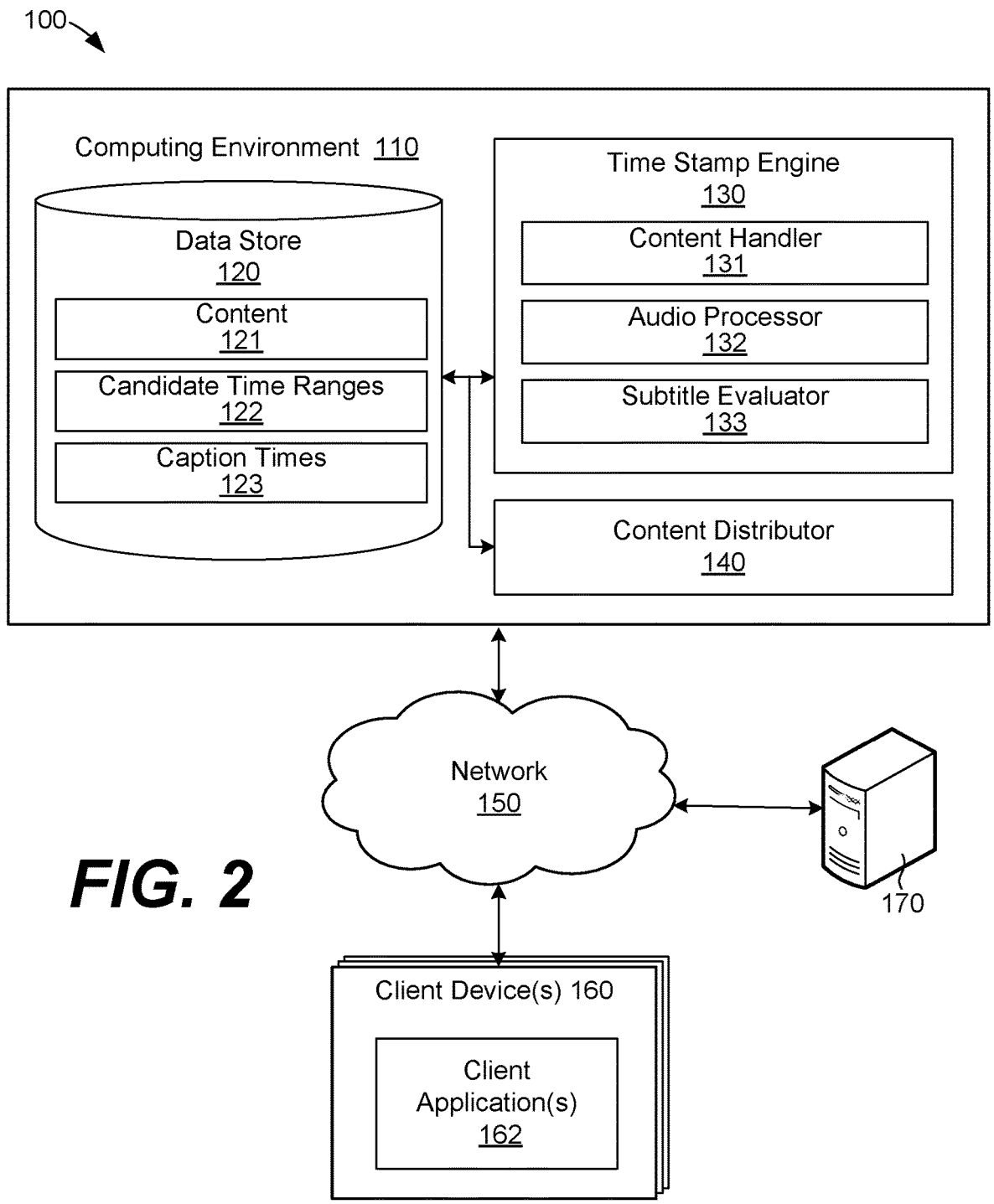
FIG. 2 illustrates a networked environment for caption time stamp prediction according to example embodiments described herein.

FIG. 2 illustrates a networked environment 100 for caption time stamp prediction according to example embodiments described herein. The networked environment 100 includes a computing environment 110, a network 150, a client device 160, and a content server 170. The computing environment 110 includes a data store 120, a time stamp engine 130, and a content distributor 140, each of which is described in further detail below.

The computing environment 110 can be embodied as one or more computing devices or systems. In various embodiments, the computing environment 110 can include one or more desktop computers, laptop computers, or computing devices arranged in one or more server or computer banks. The computing devices can be located at a single installation site or distributed among different geographical locations. As further described below in connection with FIG. 7, the computing environment 110 can include a plurality of computing devices that together embody a hosted computing resource, a grid computing resource, and/or other distributed computing arrangement. In some cases, the computing environment 110 can be embodied as an elastic computing resource where an allotted capacity of processing, network, storage, or other computing-related resources vary over time.

The computing environment 110 can also be embodied in part as various functional or logical elements (e.g., executed computer-readable instructions, logic circuitry, processing circuitry, etc.) executed or operated by the computing environment 110 to direct it to perform aspects of the embodiments described herein. In that context, the time stamp engine 130 and content distributor 140 can be embodied as functional or logical elements of the computing environment 110.

The network 150 can include the Internet, intranets, extranets, wide area networks (WANs), local area networks (LANs), wired networks, wireless (e.g., cellular, 802.11-based (WiFi), bluetooth, etc.) networks, cable networks, satellite networks, other suitable networks, or any combinations thereof. The computing environment 110 can communicate with the client device 160 and the content server 170 using various systems interconnect models and/or protocols such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), and/or other protocols for communicating data over the network 150, without limitation. Although not illustrated, the network 150 can include connections to any number of network hosts, such as website servers, file servers, networked computing resources, databases, data stores, or any other network or computing architectures.

The client device 160 is representative of one or more client devices. The client device 160 can be embodied as any computing device, processing circuit, or processor based device or system, including those embodied in the form of a desktop computer, a laptop computer, a personal digital assistant, a wearable computing device, a cellular telephone, a tablet computer, an augmented reality device, or a virtual reality device, among other example computing devices and systems. The client device 160 can include one or more subsystems and/or peripheral devices. For example, the peripheral devices may include one or more input devices, such as a keyboard, keypad, touch pad, touch screen, microphone, scanner, mouse, joystick, camera, one or more buttons, etc. The peripheral devices may also include a display, indicator lights, speakers, global navigation satellite system (GNSS) circuitry, accelerometer, or other components, depending upon the primary use of the client device 160.

As illustrated in FIG. 2, the client device 160 can execute various applications, such as the client application 162. In one embodiment, the client application 162 can be embodied as a media player application capable of interpreting and displaying various types of content files, such as image, audio, and video files, among others. To obtain content, the client device 160 and the client application 162 can interact with the computing environment 110 and the content server 170 using a suitable protocol via the network 150.

The client device 160 can also be used to access, control, and/or modify the operations of the computing environment 110 in the selection of time stamps for captions. In that case, an individual can directly access, control, and/or modify the operations of the computing environment 110, including the time stamp engine 130, via the network 150. In other aspects of the embodiments, the client device 160 can be used to access content through stored on the content server 170.

Turning back to the computing environment 110, the data store 120 includes a memory area for the storage of content 121, candidate time ranges 122, and caption times 123. The content 121 can include a number of content files, including the content file 10 shown in FIG. 1, among others. The content 121 can include video content, such as television shows, movies, movie trailers, documentaries, short videos, etc., organized in one or more data files. In that context, it should be recognized that each item stored in the content 121, including the content file 10, can include a sequence of images arranged or organized for presentation over a period of time. One or more items of the content 121 can include subtitles. In some cases, the subtitles can be maintained in a subtitle file (e.g., *.srt, *.sub, *.sbv, *.sbvor, etc. files) separate from the file or files of the video and/or audio content. The subtitle files can be organized in any standard file format, such as a format including a start time, an end time, and corresponding text for each subtitle.

The content 121 can be received or obtained from any source and can be captured in any suitable video and audio format (e.g., digital video encoding format, frame rate, horizontal and vertical resolution, aspect ratio, mono, stereo, surround sound, etc.) and/or standards (e.g., Advanced Television Systems Committee (ATSC), Digital Video Broadcasting (DVB), etc.). The content 121 can be in raw format or encoded in any suitable known lossy or lossless formats.

The content 121 is not limited to video content, however, as the concepts described herein can be applied to other types of content including images, photo strips, audio, text (e.g., web pages, news articles, books, etc.), and other forms of content. As described in further detail below, the time stamp engine 130 can process the content stored in the content 121 to select a number of time ranges or timeframes suitable for subtitles.

The candidate time ranges 122 includes a scratchpad memory area for the time stamp engine 130. As the time stamp engine 130 processes one or more items of the content 121, the time stamp engine 130 can identify a number of candidate time ranges for the addition of captions and indicators to the items of the content 121. Once identified, these candidate time ranges can be further processed and refined over a number of process steps. The time stamp engine 130 can continue to process the candidate time ranges 122, as described below, to arrive at a final series of time ranges, which are stored as the caption times 123. Thus, the caption times 123 includes a memory area to store time ranges for the addition of captions and indicators to one or more items of the content 121.

The time stamp engine 130 may include, for example, a content handler 131, an audio processor 132, and a subtitle evaluator 133. Among other functions, the content handler 131 is configured to retrieve one or more items of content stored in the content 121 for processing. The content handler 131 can retrieve, open, close, edit, and conduct other processing steps on items of content stored in the content 121.

The audio processor 132 is configured to extract audio data from the items of content stored in the content 121. Depending upon the manner in which the content is formatted, the audio processor 132 can extract the audio data from a data file including a combination of video and audio data or extract the audio data from a data file including only audio data. The audio data can be extracted at a particular sampling rate to match the scale of time used for subtitles, as described in further detail below. The audio processor 132 can also compare the audio data against a sound threshold to identify one or more auditory timeframes in the audio data. The auditory timeframes are periods of time in which the level or amplitude of sound is above the sound threshold. These and other functions of the audio processor 132 are described in further detail below with reference to FIGS. 3A and 3B.

The subtitle evaluator 133 is configured to parse subtitles contained in items of content stored in the content 121 to identify a number of subtitle-free timeframes in the content. If the subtitles are maintained in a separate subtitle file, the subtitle evaluator 133 can directly parse the subtitle file. To that end, the subtitle evaluator 133 can identify the start and end time of each subtitle in the items of content stored in the content 121. Once the start and end times of the subtitles are identified, the subtitle evaluator 133 can determine the time ranges or timeframes in which the items of content are free from subtitles. These and other functions of the subtitle evaluator 133 are described in further detail below with reference to FIGS. 4A and 4B.

Once the audio processor 132 has identified the auditory timeframes in a content file and the subtitle evaluator 133 has identified the subtitle-free timeframes in the content file, the time stamp engine 130 is configured to identify or determine when those time ranges or timeframes overlap in time. The time stamp engine 130 can compare the start and end times of each auditory timeframe and the start and end times of each subtitle-free timeframe to find the ranges of time where sound is present and subtitles are absent in the content file. The time stamp engine 130 can compile a list of these auditory and subtitle-free ranges of time as a series and store the ranges in the candidate time ranges 122. These and other functions of the time stamp engine 130 are described in further detail below with reference to FIG. 5.

The content distributor 140 is configured to provide a service for the distribution of various types of content, including video content, stored in the content 121. Thus, the content distributor 140 can serve up the content 121 as it is requested by one or more individuals using the client devices 160. The content distributor 140 can also retrieve or pull content from the content server 170 for processing by the time stamp engine 130. After processing by the time stamp engine 130, the content distributor 140 can also push content to the content server 170, and the content server 170 can distribute the content.

Turning to more particular examples, FIG. 3A illustrates an example of the audio data 14 extracted from the content file 10 shown in FIG. 1 according to example embodiments described herein. In FIG. 3A, a portion (e.g., time range) of the audio data 14 is illustrated in representative form as a waveform that varies over time based on the amplitude or volume of sound. Although a limited range of the audio data 14 is illustrated in FIG. 3A, the audio processor 132 can operate on the entire range of the audio data 14 of the content file 10, among other content files stored in the content 121. The audio data 14 can be extracted or isolated from the content file 10 by the audio processor 132 in any suitable way. The audio data 14 can be extracted at a particular sampling rate to match the scale of time used for subtitles in the content file 10. As one example, the audio data 14 can be extracted at a sampling rate of 1000 samples per second or one sample per millisecond.

An example sound threshold 200 is also illustrated in FIG. 3A. The sound threshold 200 is relied upon by the audio processor 132 to separate low-level sounds or noise in the audio data 14 from other audible sounds, such as dialogue between actresses, actors, or other characters, sound in action scenes, and other sounds. Any suitable unit of measure can be relied upon for the sound threshold 200, such as decibels (dB) or another metric of amplitude. In some cases, one or both of the audio data 14 and the units of the sound threshold 200 can be normalized. The value of the sound threshold 200 can be determined or set in various ways, including determined empirically. In one example, the sound threshold 200 can be set to a percentage of the maximum amplitude of the audio data 14, such as 1%, 2%, or 5% of the maximum amplitude. In another example, the sound threshold 200 can be set to a predetermined number, irrespective of the maximum amplitude of the audio data 14, including as low as zero. The sound threshold 200 can be varied for each item of the content 121 evaluated by the time stamp engine 130.

As shown in FIG. 3A, the audio processor 132 is configured to compare the audio data 14 against the sound threshold 200 to identify the auditory timeframes "a"-"k" in the audio data 14, among others. The auditory timeframes "a"-"k" are periods of time in which the level or amplitude of sound in the audio data 14 is above the sound threshold 200. FIG. 3B illustrates the identification of the auditory timeframes 202, including the timeframes "a"-"k", in the audio data 14 shown in FIG. 3A. The audio processor 132 can build a list of the auditory timeframes 202 and store the list in the data store 120. The auditory timeframes 202 are relied upon by the time stamp engine 130 to determine candidate time ranges for additional non-verbal and contextual captions and indicators as described below.

Figures 4A, 4B:
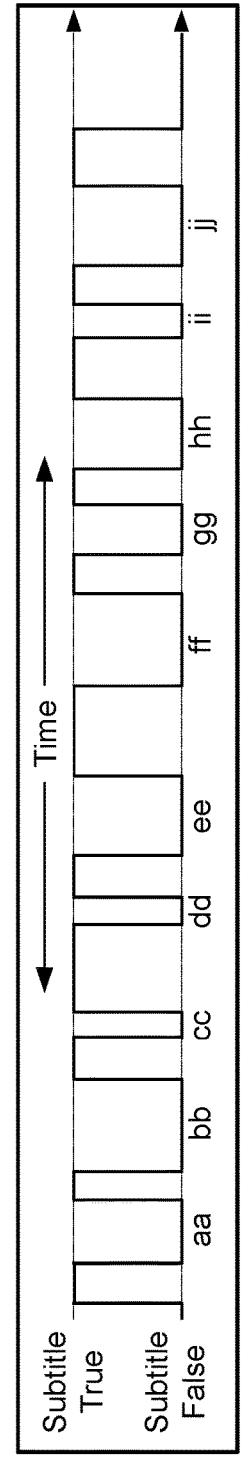
FIG. 4A illustrates an example of subtitle data according to example embodiments described herein.
FIG. 4B illustrates an example boolean time series generated using a subtitle file according to example embodiments described herein.

FIG. 4A illustrates an example of the subtitle data 16 shown in FIG. 1 according to example embodiments described herein. The subtitle data 16 includes a number of subtitle captions for display over respective timeframes of the video data 12 of the content file 10. The subtitle data 16 is provided as a representative example in FIG. 4A, and the subtitle data 16 can be organized in other ways. The number of subtitle entries shown in FIG. 4A is not exhaustive of all the entries in the subtitle data 16, which may include more entries.

The subtitle evaluator 133 is configured to parse through the entries in the subtitle data 16 to identify a number of subtitle-free timeframes in the content file 10. To start, the subtitle evaluator 133 can identify the start and end time of each entry in the subtitle data 16 of the content file 10. The start and end times of each entry in the subtitle data 16 are defined in the format of hours, minutes, seconds, and milliseconds, separated by colons, although other formats can be relied upon. Thus, in the example shown in FIG. 4A, the timing for display of subtitles is specified in milliseconds. The first entry in the subtitle data 16 includes the subtitle text of "Good morning." to be displayed from the start time of 00:05:00,020 to the end time of 00:05:01,120. The second entry includes the subtitle text of "Is Spring Street in this direction?" to be displayed from the start time of 00:05:02,054 to the end time of 00:05:04,084, and so on.

Based on the start and end times of the subtitles in the subtitle data 16, the subtitle evaluator 133 can generate a boolean time series representative of whether or not subtitle captions are designated for display over respective frames of the video data 12. FIG. 4B illustrates an example boolean time series 204 generated by the subtitle evaluator 133 using the subtitle data 16 shown in FIG. 4A. The boolean time series 204 exhibits a logical true when a subtitle caption is designated for display over one or more frames of the video data 12. The boolean time series 204 also exhibits a logical false when no subtitle caption is designated for display over the video data 12. The false time ranges or timeframes "aa"-"jj" in the boolean time series 204 are subtitle-free timeframes in the content file 10. In other words, the subtitle-free timeframes "aa"-"jj" are periods of time in which no subtitles or captions are scheduled for display in the content file 10.

Figure 5:
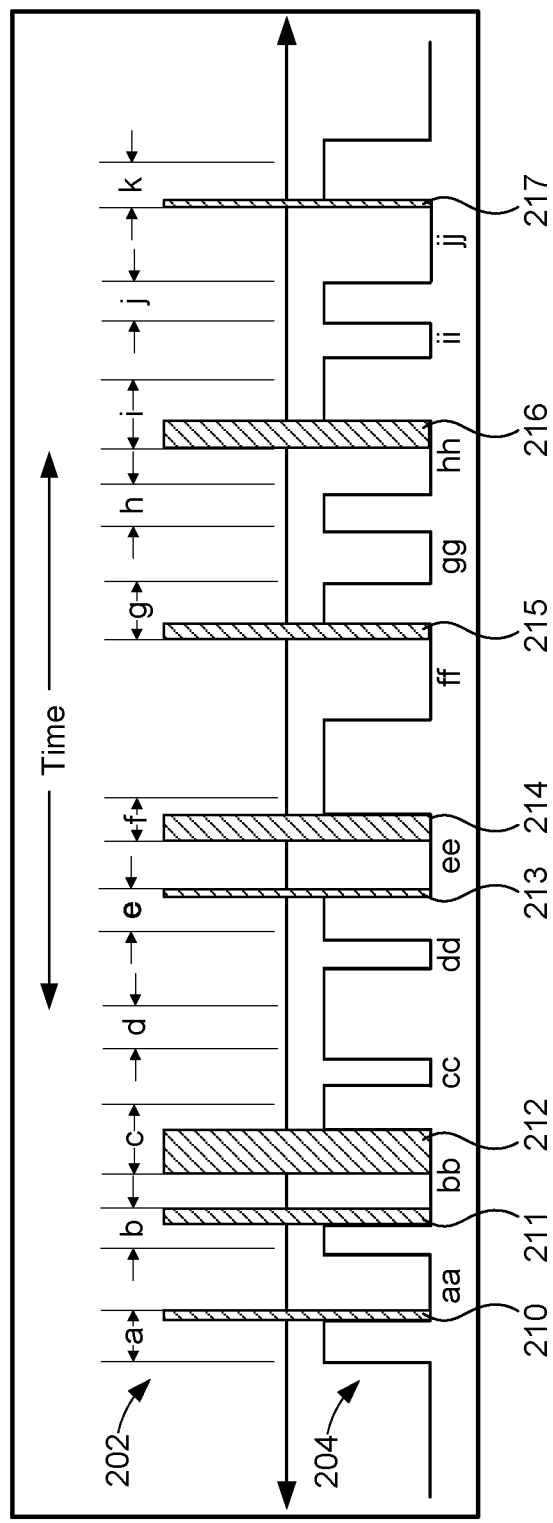
FIG. 5 illustrates an example of the identification of candidate time ranges according to example embodiments described herein.

FIG. 5 illustrates an example of the identification of candidate time ranges according to example embodiments described herein. In FIG. 5, the auditory timeframes 202, including the timeframes "a"-"k", are presented in time coinciding with the boolean time series 204, including the timeframes "aa"-"jj". The time stamp engine 130 is configured to identify overlapping ranges of the auditory timeframes 202 and the subtitle-free parts of the boolean time series 204 over time. In the example shown in FIG. 5, the auditory timeframes 202 and the subtitle-free parts of the boolean time series 204 overlap in certain time ranges, shown as shaded boxes, and the time stamp engine 130 is configured to identify the candidate time ranges 210-219 where those overlaps occur. The time stamp engine 130 can store the candidate time ranges 210-219 in the data store 120 as candidate time ranges 122.

The candidate time ranges 210-219 are ranges of time in the content file 10, which may be video content as shown in FIG. 1, where the audio data 14 will reproduce relatively low or no sound and the subtitle data 16 has no subtitle or caption for display over the video data 12. Thus, the candidate time ranges 210-219 may be suitable ranges in which to insert additional non-verbal and contextual captions and indicators.

Once the candidate time ranges 210-219, among others, are identified, the time stamp engine 130 can further manipulate and refine them to arrive at a final series of caption times to insert captions and indicators into the content file 10. For example, the time stamp engine 130 can merge two or more of the candidate time ranges 210-219, among others, based on a merge threshold. The merge threshold can be a minimum amount of time between two candidate time ranges, such as ten milliseconds. In other cases, the merge threshold can range between about ten milliseconds to about two hundred milliseconds. Thus, the time stamp engine 130 can merge two or more candidate time ranges together to form a single candidate time range, if the difference in time between each of the candidate time ranges is less than about ten milliseconds. As a particular example, the time stamp engine 130 can merge the candidate time range 211 together with the candidate time range 212 if the difference in time between them is less than about ten milliseconds. In doing so, the time stamp engine 130 can generate a merged series of candidate time ranges.

The time stamp engine 130 can also omit one or more of the candidate time ranges 210-219, among others, based on a minimum duration threshold. The minimum duration threshold can be a minimum amount of time for a candidate time range. As a particular example, the time stamp engine 130 can omit the candidate time range 217 if a length of the candidate time range 217 is less than one second. However, the minimum duration threshold can be other values of time or ranges of time in other cases, such as a range of time from about one half of a second to two seconds or more. After merging and omitting candidate time ranges, the time stamp engine 130 can arrive at a final series of caption times to store in the data store 120 as the caption times 123.

Based on the processing performed by the time stamp engine 130, the caption times 123 includes a list of audible and subtitle-free time ranges in the content file 10 where additional captions can be added to the content file 10. The caption times 123 can be provided in any suitable format including start and end times for the additional captions. Any suitable captions can be inserted into the content file 10 at the caption times 123, and the subtitle data 16 can be updated by the time stamp engine 130, for example, or another process to include those additional captions.

In other aspects of the embodiments, the audio processor 132 can conduct an analysis to provide suggestions for the context or content of the additional captions. For example, the audio processor 132 can process the audio data 14 of the content file 10 over at least a portion of the timeframe "a" shown in FIG. 5 to provide a suggested caption for the candidate time range 210. In that analysis, the audio processor 132 can generate a sound signature associated with at least a portion of the timeframe "a" through a frequency analysis of the audio data 14. In a similar way, the audio processor 132 can conduct an analysis of the audio data 14 during at least a portion of the timeframe "b" to generate a sound signature for the candidate time range 211, and so on.

The audio processor 132 can also compare the sound signatures with other, known signatures for certain sounds, such as dogs barking, carts meowing or purring, gunshots, screeching tires, music playing, doorbells ringing, glass breaking, or other distinct sounds. As matches are identified based on that comparison, the audio processor 132 can suggest the subtitle text for one or more of the candidate time ranges 210-217.

Figure 6:
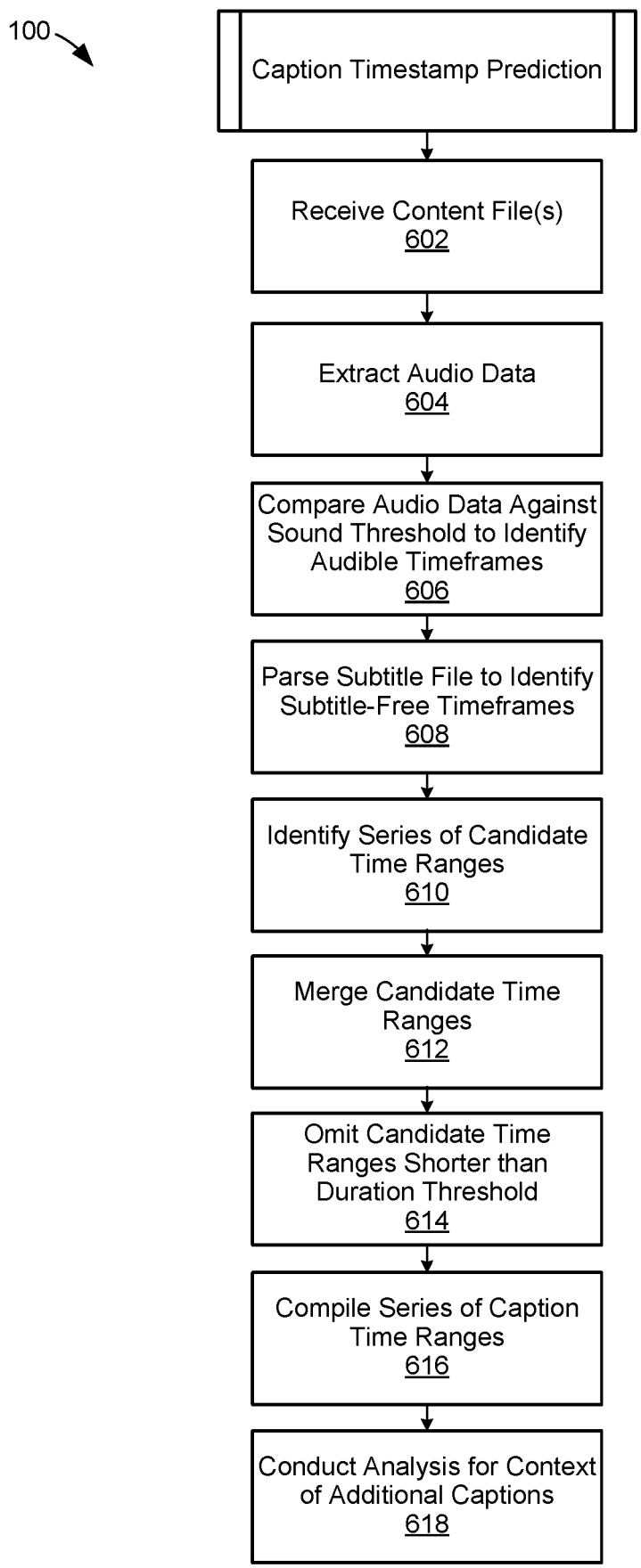
FIG. 6 illustrates a process of caption timestamp prediction performed by the computing environment shown in FIG. 2 according to various example embodiments described herein.

Building on the description above, FIG. 6 illustrates a process of caption timestamp prediction performed by the computing environment shown in FIG. 2 according to various example embodiments described herein. In certain aspects, the process flowchart in FIG. 6 can be viewed as depicting an example set of steps performed by the computing environment 110. The flowchart in FIG. 6 provides merely one example of a functional sequence or arrangement of steps that can be employed to implement the aspects caption time stamp prediction described herein. Although the process is described in connection with the computing environment 110, other computing environments, systems, and/or devices can perform the process. Additionally, although not explicitly stated, any number of intermediate data accessing, storing, and logging steps can be performed among the time stamp engine 130, the data store 120, and other components in the computing environment 110.

At reference numeral 602, the process includes the computing environment 110 receiving one or more content files for processing by the time stamp engine 130. The content distributor 140 can receive one or more content files, such as the content file 10 shown in FIG. 1, from the content server 170 or another content distribution network or service. The content distributor 140 can store the content files in the data store 120 as the content 121. In one example, the content files can include video data, audio data, and subtitle data. The subtitle data can include subtitle captions for display over certain frames of the video data. In other cases, the video, audio, and subtitle data can be combined into one or more files, depending upon the manner in which the content 121 is encoded. Once stored in the data store 120, the content handler 131 can retrieve individual content files, such as the content file 10, for processing by the time stamp engine 130.

The remaining steps in the process shown in FIG. 6 are described with reference to the content file 10 shown in FIG. 1, but the process can be performed similarly on other content files. At reference numeral 604, the process includes the audio processor 132 extracting the audio data 14 from the content file 10. The audio data 14 can be extracted at a particular sampling rate to match the scale of time used for subtitles in the content file 10. For example, if the timing for display of subtitles is specified in milliseconds in the subtitle data 16, then the audio processor 132 can extract the audio data 14 at a rate of one thousand samples per second to match the scale of time used for the subtitle data 16. An example range of extracted audio data 14 is illustrated in FIG. 3A.

At reference numeral 606, the process includes the audio processor 132 comparing the audio data 14 extracted at reference numeral 604 against a sound threshold to identify auditory timeframes in which sound is above the sound threshold. An example sound threshold 200 is illustrated in FIG. 3A. The sound threshold 200 is relied upon by the audio processor 132 to separate noise in the audio data 14 from other audible sounds, such as dialogue between actresses, actors, or other characters, sound in action scenes, and other sounds. Any suitable unit of measure can be relied upon for the sound threshold 200, such as decibels (dB) or another metric of amplitude.

The value of the sound threshold 200 can be determined or set in various ways, including determined empirically. In one example, the sound threshold 200 can be set to a percentage of the maximum amplitude of the audio data 14, such as 1%, 2%, or 5% of the maximum amplitude. In another example, the sound threshold 200 can be set to a predetermined number irrespective of the maximum amplitude of the audio data 14, including as low as zero. The sound threshold 200 can be varied for each item of the content 121 evaluated by the time stamp engine 130.

As shown in FIG. 3A, the audio processor 132 can compare the audio data 14 against the sound threshold 200 to identify the auditory timeframes "a"-"k" in the audio data 14, among others. The auditory timeframes "a"-"k" are periods of time in which the level or amplitude of sound in the audio data 14 is above the sound threshold 200. FIG. 3B illustrates the identification of the auditory timeframes 202 at reference numeral 606, including the timeframes "a"-"k", in the audio data 14 shown in FIG. 3A. The audio processor 132 can build a list of the auditory timeframes 202 and store the list in the data store 120.

At reference numeral 608, the process includes the subtitle evaluator 133 parsing the subtitle data 16 to identify a plurality of subtitle-free timeframes in the video data 12 of the content file 10. To start, the subtitle evaluator 133 can identify the start and end time of each entry in the subtitle data 16. Based on the start and end times of the subtitles in the subtitle data 16, the subtitle evaluator 133 can generate a boolean time series representative of whether or not subtitle captions are designated for display over respective frames of the video data 12 as shown in FIG. 4B. FIG. 4B illustrates an example boolean time series 204 generated by the subtitle evaluator 133 using the subtitle data 16 shown in FIG. 4A. The boolean time series 204 exhibits a logical true when a subtitle caption is designated for display over one or more frames of the video data 12. The boolean time series 204 also exhibits a logical false when no subtitle caption is designated for display over the video data 12. The false time ranges or timeframes "aa"-"jj" in the boolean time series 204 are subtitle-free timeframes in the content file 10.

At reference numeral 610, the process includes the time stamp engine 130 identifying a series of candidate time ranges based on overlapping ranges of the auditory timeframes 202 identified at reference numeral 606 and the subtitle-free timeframes in the boolean time series 204 identified at reference numeral 608. In FIG. 5, the auditory timeframes 202, including the timeframes "a"-"k", are presented in time coinciding with the boolean time series 204, including the timeframes "aa"-"jj". The time stamp engine 130 is configured to identify overlapping ranges of the auditory timeframes 202 and the subtitle-free parts of the boolean time series 204 at reference numeral 610. In the example shown in FIG. 5, the auditory timeframes 202 and the subtitle-free parts of the boolean time series 204 overlap in the time ranges shown as shaded boxes, and the time stamp engine 130 is configured to identify the candidate time ranges 210-219 where those overlaps occur. The time stamp engine 130 can store the candidate time ranges 210-219 in the data store 120 as candidate time ranges 122. The candidate time ranges 210-219 may be suitable ranges in which to insert additional non-verbal and contextual captions and indicators as described herein.

At reference numeral 612, the process includes the time stamp engine 130 merging two or more of the candidate time ranges 210-219, among others, identified at reference numeral 612 based on a merge threshold. The merge threshold can be a minimum amount of time between two candidate time ranges, such as less than about ten milliseconds to two hundred milliseconds. Thus, the time stamp engine 130 can merge two or more candidate time ranges together, to form a single candidate time range, if the difference in time between the candidate time ranges is less than about ten milliseconds. As a particular example, the time stamp engine 130 can merge the candidate time range 211 together with the candidate time range 212 if the difference in time between them is less than about ten milliseconds. In doing so, the time stamp engine 130 can generate a merged series of candidate time ranges.

At reference numeral 614, the process includes the time stamp engine 130 omitting one or more of the candidate time ranges 210-219, among others, based on a minimum duration threshold. The minimum duration threshold can be a minimum amount of time for a candidate time range. As a particular example, the time stamp engine 130 can omit the candidate time range 217 if a length of the candidate time range 217 is less than one half a second or one second. After merging and omitting candidate time ranges, the time stamp engine 130 can arrive at a final series of caption times, at reference numeral 616, to store in the data store 120 as the caption times 123.

Based on the processing performed by the time stamp engine 130, the caption times 123 includes a list of audible and subtitle-free time ranges in the content file 10 where additional captions can be added to the content file 10. The caption times 123 can be provided in any suitable format including start and end times for the additional captions. Any suitable captions can be inserted into the content file 10 at the caption times 123, and the subtitle data 16 can be updated by the time stamp engine 130, for example, or another process to include those additional captions for display in connection with the content file 10.

At reference numeral 618, the process includes the audio processor 132 conducting an analysis to provide suggestions for the additional captions at the caption times 123. For example, the audio processor 132 can process the audio data 14 of the content file 10 over at least a portion of the timeframe "a" shown in FIG. 5 to provide a suggested caption for the candidate time range 210. In that analysis, the audio processor 132 can generate a sound signature associated with at least a portion of the timeframe "a" through a frequency analysis of the audio data 14. The audio processor 132 can also compare the sound signature with other, known signatures for certain sounds, such as dogs barking, carts meowing or purring, gunshots, screeching tires, music playing, doorbells ringing, glass breaking, or other distinct sounds. Based on that comparison, the audio processor 132 can suggest the subtitle text for the candidate time range 210, among other caption times 123.

Figure 7:
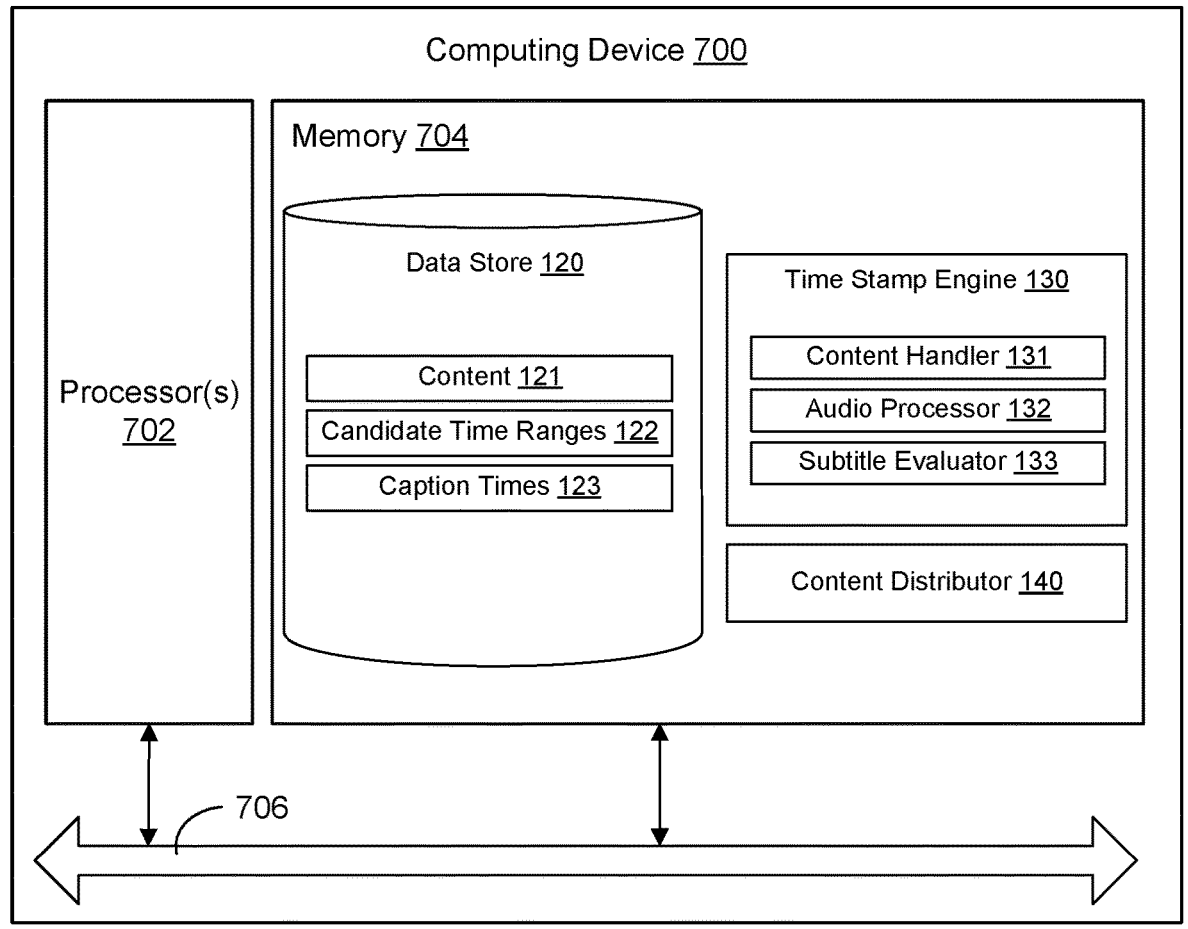
FIG. 7 illustrates an example schematic block diagram of a computing device for the computing environment shown in FIG. 2 according to various embodiments described herein.

FIG. 7 illustrates an example schematic block diagram of a computing device 700 for the computing environment 110 shown FIG. 2 according to various embodiments described herein. The computing device 700 includes at least one processing system, for example, having a processor 702 and a memory 704, both of which are electrically and communicatively coupled to a local interface 706. The local interface 706 can be embodied as a data bus with an accompanying address/control bus or other addressing, control, and/or command lines.

In various embodiments, the memory 704 stores data and software or executable-code components executable by the processor 702. For example, the memory 704 can store executable-code components associated with the time stamp engine 130 and the content distributor 140 for execution by the processor 702. The memory 704 can also store data such as that stored in the data store 120, among other data.

It is noted that the memory 704 can store other executable-code components for execution by the processor 702. For example, an operating system can be stored in the memory 704 for execution by the processor 702. Where any component discussed herein is implemented in the form of software, any one of a number of programming languages can be employed such as, for example, C, C++, C#, Objective C, JAVA®, JAVASCRIPT®, Perl, PHP, VISUAL BASIC®, PYTHON®, RUBY, FLASH®, or other programming languages.

As discussed above, in various embodiments, the memory 704 stores software for execution by the processor 702. In this respect, the terms "executable" or "for execution" refer to software forms that can ultimately be run or executed by the processor 702, whether in source, object, machine, or other form. Examples of executable programs include, for example, a compiled program that can be translated into a machine code format and loaded into a random access portion of the memory 704 and executed by the processor 702, source code that can be expressed in an object code format and loaded into a random access portion of the memory 704 and executed by the processor 702, or source code that can be interpreted by another executable program to generate instructions in a random access portion of the memory 704 and executed by the processor 702, etc.

An executable program can be stored in any portion or component of the memory 704 including, for example, a random access memory (RAM), read-only memory (ROM), magnetic or other hard disk drive, solid-state, semiconductor, universal serial bus (USB) flash drive, memory card, optical disc (e.g., compact disc (CD) or digital versatile disc (DVD)), floppy disk, magnetic tape, or other types of memory devices.

In various embodiments, the memory 704 can include both volatile and nonvolatile memory and data storage components. Volatile components are those that do not retain data values upon loss of power. Nonvolatile components are those that retain data upon a loss of power. Thus, the memory 704 can include, for example, a RAM, ROM, magnetic or other hard disk drive, solid-state, semiconductor, or similar drive, USB flash drive, memory card accessed via a memory card reader, floppy disk accessed via an associated floppy disk drive, optical disc accessed via an optical disc drive, magnetic tape accessed via an appropriate tape drive, and/or other memory component, or any combination thereof. In addition, the RAM can include, for example, a static random access memory (SRAM), dynamic random access memory (DRAM), or magnetic random access memory (MRAM), and/or other similar memory device. The ROM can include, for example, a programmable read-only memory (PROM), erasable programmable read-only memory (EPROM), electrically erasable programmable read-only memory (EEPROM), or other similar memory device.

The processor 702 can be embodied as one or more processors 702 and the memory 704 can be embodied as one or more memories 704 that operate in parallel, respectively, or in combination. Thus, the local interface 706 facilitates communication between any two of the multiple processors 702, between any processor 702 and any of the memories 704, or between any two of the memories 704, etc. The local interface 706 can include additional systems designed to coordinate this communication, including, for example, a load balancer that performs load balancing.

As discussed above, time stamp engine 130 and the content distributor 140 can be embodied, at least in part, by software or executable-code components for execution by general purpose hardware. Alternatively the same can be embodied in dedicated hardware or a combination of software, general, specific, and/or dedicated purpose hardware. If embodied in such hardware, each can be implemented as a circuit or state machine, for example, that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

The flowchart or process diagrams in FIG. 6 is representative of certain processes, functionality, and operations of the embodiments discussed herein. Each block can represent one or a combination of steps or executions in a process. Alternatively or additionally, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as the processor 702. The machine code can be converted from the source code, etc. Further, each block can represent, or be connected with, a circuit or a number of interconnected circuits to implement a certain logical function or process step.

Although the flowchart or process diagram in FIG. 6 illustrates a specific order, it is understood that the order can differ from that which is depicted. For example, an order of execution of two or more blocks can be scrambled relative to the order shown. Also, two or more blocks shown in succession can be executed concurrently or with partial concurrence. Further, in some embodiments, one or more of the blocks can be skipped or omitted. In addition, any number of counters, state variables, warning semaphores, or messages might be added to the logical flow described herein, for purposes of enhanced utility, accounting, performance measurement, or providing troubleshooting aids, etc. Such variations, as understood for implementing the process consistent with the concepts described herein, are within the scope of the embodiments.

Also, any logic or application described herein, including time stamp engine 130 and the content distributor 140 that are embodied, at least in part, by software or executable-code components, can be embodied or stored in any tangible or non-transitory computer-readable medium or device for execution by an instruction execution system such as a general purpose processor. In this sense, the logic can be embodied as, for example, software or executable-code components that can be fetched from the computer-readable medium and executed by the instruction execution system. Thus, the instruction execution system can be directed by execution of the instructions to perform certain processes such as those illustrated in FIG. 6. In the context of the present disclosure, a non-transitory computer-readable medium can be any tangible medium that can contain, store, or maintain any logic, application, software, or executable-code component described herein for use by or in connection with an instruction execution system.

The computer-readable medium can include any physical media such as, for example, magnetic, optical, or semiconductor media. More specific examples of suitable computer-readable media include, but are not limited to, magnetic tapes, magnetic floppy diskettes, magnetic hard drives, memory cards, solid-state drives, USB flash drives, or optical discs. Also, the computer-readable medium can include a RAM including, for example, an SRAM, DRAM, or MRAM. In addition, the computer-readable medium can include a ROM, a PROM, an EPROM, an EEPROM, or other similar memory device.

Disjunctive language, such as the phrase "at least one of X, Y, or Z," unless specifically stated otherwise, is to be understood with the context as used in general to present that an item, term, etc., can be either X, Y, or Z, or any combination thereof (e.g., X, Y, and/or Z). Thus, such disjunctive language is not generally intended to, and should not, imply that certain embodiments require at least one of X, at least one of Y, or at least one of Z to be each present.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

Therefore, at least the following is claimed:

1. A non-transitory computer-readable medium embodying at least one program that, when executed by at least one computing device, directs the at least one computing device to:
receive a video data and a subtitle data, the subtitle data comprising a plurality of subtitle captions for display over respective timeframes of the video data;
extract audio data from the video data at a particular sampling rate;
compare the audio data against a sound threshold to identify a plurality of auditory timeframes in the audio data in which sound is above the sound threshold;
parse the subtitle data to identify a plurality of subtitle-free timeframes in the video data;
compare the plurality of auditory timeframes with the plurality of subtitle-free timeframes to identify where the plurality of auditory timeframes overlap with the plurality of subtitle-free timeframes as a series of candidate time ranges for additional subtitles;
merge at least two candidate time ranges among the series of candidate time ranges based on a merge threshold to generate a merged series of candidate time ranges; and
omit at least one candidate time range from the merged series of candidate time ranges that is shorter than a duration threshold to provide a series of caption time ranges.

2. The non-transitory computer-readable medium according to claim 1, wherein, to identify the plurality of auditory timeframes in the audio data, the at least one computing device is further directed to isolate sound in the audio data from noise in the audio data.

3. The non-transitory computer-readable medium according to claim 1, wherein, to identify the plurality of subtitle-free timeframes in the video data, the at least one computing device is further directed to generate a boolean time series representative of whether or not subtitle captions are designated for display over respective frames of the video data over time.

4. A method, comprising:
extracting, by at least one computing device, audio data from content;
identifying, by the at least one computing device, a plurality of first timeframes in the audio data in which sound in the content is above a threshold;
parsing, by the at least one computing device, subtitle data associated with the content to identify a plurality of second timeframes in which the content is free from subtitles;

comparing, by the at least one computing device, the plurality of first timeframes with the plurality of second timeframes to identify where the plurality of first timeframes overlap with the plurality of second timeframes as a series of candidate time ranges for additional subtitles; and merging, by the at least one computing device, at least two candidate time ranges among the series of candidate time ranges together based on a merge threshold.

5. The method according to claim 4, wherein:
the content comprises video data and the subtitle data; and
the subtitle data comprises a plurality of subtitle captions for display over respective timeframes of the video data.

6. The method according to claim 4, wherein identifying the plurality of first timeframes comprises isolating, by the at least one computing device, sound in the audio data from noise in the audio data.

7. The method according to claim 4, wherein extracting the audio data comprises extracting the audio data at a sampling rate to match a time scale in the subtitle data.

8. The method according to claim 7, wherein the sampling rate comprises one sample per millisecond.

9. The method according to claim 4, wherein parsing the subtitle data comprises generating, by the at least one computing device, a boolean time series representative of whether or not subtitle captions are designated for display over time.

10. The method according to claim 4, wherein the merging comprises merging, by the at least one computing device, the at least two candidate time ranges together based on a difference in time between the at least two candidate time ranges being less than the merge threshold, to generate a series of merged candidate time ranges.

11. The method according to claim 10, wherein the merge threshold comprises ten milliseconds.

12. The method according to claim 10, further comprising omitting, by the at least one computing device, at least one merged candidate time range from the series of merged candidate time ranges, the at least one merged candidate time range being shorter than a duration threshold.

13. The method according to claim 12, wherein the duration threshold comprises one second.

14. The method according to claim 12, further comprising compiling, by the at least one computing device, a series of caption time ranges from the series of merged candidate time ranges.

15. A system, comprising:
a memory device to store computer-readable instructions thereon; and
at least one computing device configured through execution of the computer-readable instructions to:
identify a plurality of first timeframes in content in which sound is above a threshold;
parse subtitle data associated with the content to identify a plurality of second timeframes in which the content is free from subtitles;
compare the plurality of first timeframes with the plurality of second timeframes to identify where the plurality of first timeframes overlap with the plurality of second timeframes as a series of candidate time ranges for additional subtitles; and
merge at least two candidate time ranges among the series of candidate time ranges together based on a merge threshold.

16. The system of claim 15, wherein:
the content comprises video data and the subtitle data; and
the subtitle data comprises a plurality of subtitle captions for display over respective timeframes of the video data.

17. The system of claim 15, wherein, to parse the subtitle data, the at least one computing device is configured to generate a boolean time series representative of whether or not subtitle captions are designated for display over time.

18. The system of claim 15, wherein, to identify the plurality of first timeframes, the at least one computing device is configured to isolate sound in the content from noise in the content.

19. The system of claim 18, wherein the at least one computing device is configured to merge the at least two candidate time ranges together based on a difference in time between the at least two candidate time ranges being less than the merge threshold, to generate a series of merged candidate time ranges.

20. The system of claim 19, wherein the at least one computing device is further configured to omit at least one merged candidate time range from the series of merged candidate time ranges, the at least one merged candidate time range being shorter than a duration threshold.

* * * * *